Figure 1:
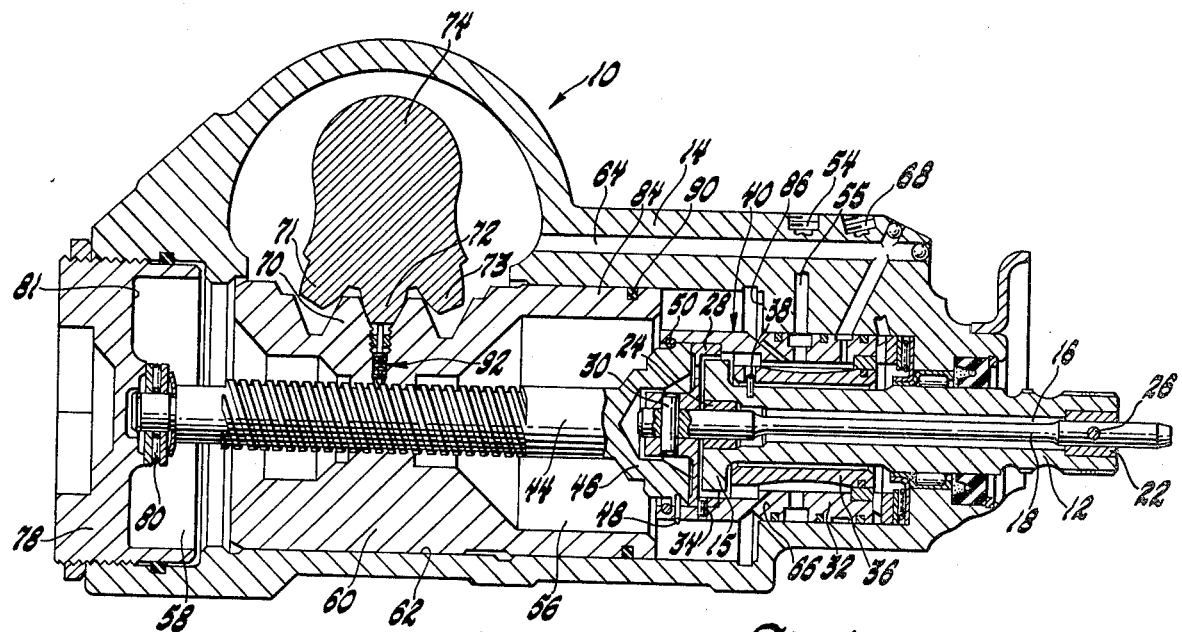

United States Patent [19]

Dzioba et al.

[11] 4,217,811

[45] Aug. 19, 1980

[54] LASH COMPENSATOR FOR POWER STEERING GEAR

[75] Inventors: Donald L. Dzioba, Frankenmuth; Dennis C. Eckhardt, Saginaw, both of Mich.

[73] Assignee: General Motors Corporation, Detroit, Mich.

[21] Appl. No.: 945,649

[22] Filed: Sep. 25, 1978

[51] Int. Cl.³ .............................. F15B 9/10; F01B 9/00
[52] U.S. Cl. .................................. 91/375 A; 92/136; 74/499; 74/424.8 R
[58] Field of Search ..... 74/499, 424.8 VA, 424.8 VZ, 74/388 PS, 424.8 R; 180/48, 146, 147; 91/375 A, 375 R

[56] References Cited

U.S. PATENT DOCUMENTS

| 2,875,631 | 3/1959 | Syring | 74/424.8 |
| 3,132,719 | 5/1964 | Cole | 184/65 |
| 3,665,783 | 5/1972 | Arnold | 74/498 |
| 4,036,110 | 7/1977 | Golonska et al. | 91/375 A |

*Primary Examiner*—Paul E. Maslousky
*Attorney, Agent, or Firm*—Charles R. White

[57] ABSTRACT

Power steering gear with integral rotary valve for directing hydraulic pressure fluid to and from a piston nut and in which a sector gear actuated plunger provides a drag load on piston nut screw so that the valve body will be grounded and the valve spool will be immediately turned relative to the valve body on rotation of the stub shaft before there is lash take-up between the threads of the piston nut and screw which drivingly connect the valve body to the piston nut and sector gear.

4 Claims, 2 Drawing Figures

U.S. Patent  Aug. 19, 1980  4,217,811

LASH COMPENSATOR FOR POWER STEERING GEAR

This invention relates to lash compensation between threaded members and more particularly to a new and improved power steering gear having an integral rotary hydraulic valve and a sector gear actuated plunger providing lash compensation between the threaded piston nut and screw for auxiliary reaction improving valve operation so that the valve effectively and efficiently controls operation of the piston nut.

Many hydraulic power steering gear systems for vehicles employ a hydraulically actuated piston nut for turning a sector gear or output operatively connected to the dirigible wheels of the vehicle through a steering linkage. Generally, these systems utilize hydraulic valving integral with the gear in which the turning resistance of the tires on the roadway dictates the degree of valve actuation required to build hydraulic pressures on the piston nut that provide the power assist forces required to perform the desired steering maneuver. These systems also employ an input driven screw which is threaded through the piston nut providing a mechanical drive connection from the input to the sector gear. The thread between the screw and piston nut forms part of the reaction system required for valve actuation. When physical lash is present between the threaded connection between the piston nut and screw there is often a slight lag in response in the valving on handwheel movement because the screw threads in or out of the rack piston nut a minute distance until the threads of the screw bottom on the flanks of the threads of the piston nut. When this occurs, the input side of the integral valve is turned or otherwise displaced by further handwheel rotation as the output side of the valve is held stationary by the screw grounded through the sector gear to the road wheels. Hydraulic pressure builds in the system as gap closure in the valving produces resistance to pump flow. The selective connection of the piston nut pressure chambers with this pressure and to the exhaust port by the valving produces power assist steering as will be understood by those skilled in this art. While the prior art power steering gears have generally provided efficient and high quality power steering with good reliability it is an objective of this invention to make such gears even more efficient and more effective.

The present invention is drawn more specifically to a power steering gear having physical lash present in the thread connection between the piston nut and screw. However, such lash does not delay or otherwise detract from the valve operation since there is a new and improved sector gear operated plunger featured in this invention that provides lash compensation auxiliary reaction for the hydraulic valving so that the valve does not recognize thread clearances when the gear is in a neutral or straight ahead drive condition. This is accomplished in this invention by adding friction between the screw and the piston nut other than the friction provided by the thread connection between the piston nut and screw.

More particularly in this power steering gear, there is a sector gear actuated plunger contained within the piston nut of the gear to provide improved valve operation; this plunger incorporates a contact that frictionally engages the screw of the power steering gear to provide reaction for the output side of the rotary valve that allows the input side of the valve to be immediately rotated relative thereto by the vehicle operator. On rotation of the input, the valve is immediately actuated to accelerate the hydraulic operation of the piston nut and the mating output sector gear. In the preferred embodiment of this invention, the plunger provides the auxiliary reaction only when the gear is conditioned for a straight ahead mode of operation so that there is no additional friction forces to be overcome when the handwheel is released and the gear returns toward the centered position.

Accordingly, it is a feature, object and advantage of this invention to provide a new and improved integral power steering gear having a threaded connection between an input driven screw of the gear and the hydraulically actuated piston nut and further having a sector gear actuated plunger mounted within the piston nut that produces auxiliary or artificial reaction for the relatively rotatable valve elements so that the valve immediately responds to input turning regardless of lash in the threaded connection for the improved hydraulic actuation of the piston nut and the turning of the gear output.

It is another feature, object and advantage of this invention to provide a new and improved power steering gear having an integral valve arrangement with relatively rotatable valve parts in which one of the valve parts is held with respect to the first valve part by plunger means internal of the steering gear as the gear is moved from the straight ahead position to right and left turns so that there is instantaneous relative movement of the valve parts for the accelerated hydraulic actuation of the piston nut in response to manual turning of the input shaft of the gear.

It is another feature, object and advantage of this invention to provide a new and improved integral power steering gear in which a sector gear operated plunger device provides reaction for a hydraulic valve output on rotation of an input shaft which drives a valve input so that the valve will be immediately actuated regardless of lash occurring in the threaded connection between the threads of the screw and the piston nut for improving the efficiency of valve and power steering operation.

It is another feature, object and advantage of this invention to provide a new and improved lash compensator between an externally helically threaded worm and an internally helically threaded nut having flank clearance therebetween and having a transversely oriented plunger carried by an internally threaded nut and extended through a wall thereof at the root between adjacent threads and engageable with the crest of a thread on a cooperating screw threaded therethrough so as to impose a friction load on the screw to preclude movement of the screw relative to the nut through flank clearance of the threaded members.

Figure 2:
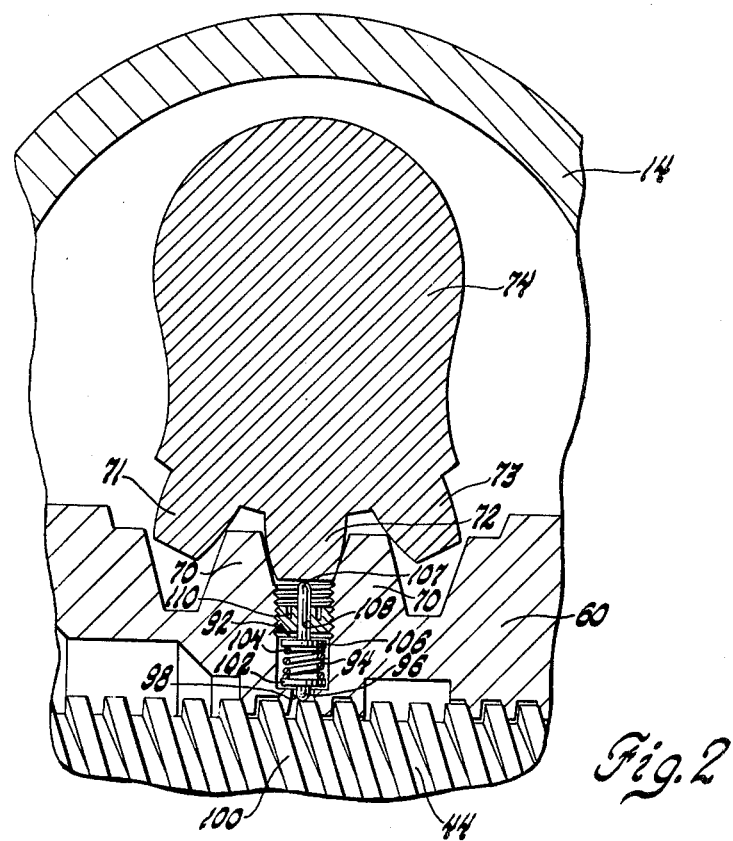

These and other features, objects and advantages of this invention will be more apparent from the following detailed description and drawings in which:

FIG. 1 is a side view of an integral power steering gear in accordance with this invention; and FIG. 2 is an enlarged view of a portion of the power steering gear of FIG. 1.

Turning now in greater detail to the drawings, there is shown in FIG. 1 a power steering gear 10 having an elongated stub shaft 12 mounted for turning movement in a steering gear housing 14 and terminating in an enlarged head portion 15. The stub shaft has an axial passage 16 therethrough which receives a torsion bar 18 supported for twisting movement therein by bearings 22 and 24. The outer end of the torsion bar is secured by pin 26 to the stub shaft 12 while the inner end is drivingly connected to an annular end cap 28 by a connector pin 30. The end cap 28 is in turn operatively connected to a cylindrical valve body 32 by radial connector pin 34. The valve body 32 extends axially in the housing and is supported for limited turning movement therein with respect to an open center valve spool 36 inwardly concentric with respect to the valve body 32. The valve spool 36 is drivingly connected to the stub shaft 12 by radial pin 38 for turning movement therewith.

The valve body and valve spool being yieldably interconnected by the torsion bar are relatively rotatable with respect to each other when the valve body is grounded and when there is turning movement of the stub shaft from the handwheel, not shown. The valve body and spool form a valve assembly 40 controlling the hydraulic operation of the steering gear as more fully explained in U.S. Pat. No. 3,022,772 issued Feb. 27, 1962 to B. B. Zeigler et al for Rotary Power Steering Valve with Torsion Bar Centering and in U.S. Pat. No. 4,009,641 to Robert P. Rohde et al for Compact Power Steering Gear. These disclosures are hereby incorporated into this specification by reference. An elongated screw or worm 44 extends axially in the housing 14 from the inboard end of valve assembly 40. As shown, the screw has an enlarged annular head 46 which nests within the inner end of the valve body 32 and which is secured thereto by pin and slot means 48 and by a retainer ring 50. These connections prevent axial separation of the screw and the valve body as well as their relative rotation. The screw 44 is also operatively connected to the head portion 15 of the stub shaft 12 by a suitable lost motion mechanism which is known in the art and is fully described in the patents to Zeigler et al and Rohde et al identified above.

The valve assembly 40 is fed with pressure fluid from a power steering pump, not shown, through a pressure port 54 and connected inlet passage 55. The valve assembly controls the supply and exhaust of pressure fluid to and from pressure chambers 56 and 58 formed on either side of a generally cylindrical piston nut 60 slidably mounted in a bore 62 formed in housing 14. Passage 64 in the housing 14, hydraulically connects the chamber 58 with the valve assembly 40 and passage 66 in the valve body 32 hydraulically connects chamber 56 with the valve assembly. Return port 68 is an exhaust for conducting fluid from the valve assembly 40 back to the power steering sump and pump as more fully described in the above referenced patents to Zeigler et al and Rohde et al.

The piston nut 60 has a rack whose teeth 70 mesh with the teeth 71, 72 and 73 of a sector gear 74 mounted for limited turning movement in housing 14. The sector gear 74 is operatively connected through a pitman shaft and an associated steering linkage to the dirigible wheels of the vehicle, which are not shown.

The steering gear housing 14 is closed by an adjuster plug 78 threaded into one end thereof. As shown, the screw 44 extends axially into the housing and is supported at one end by a thrust bearing assembly 80 operatively disposed between the adjuster plug and a shoulder on screw 44. The interior radial wall 81 of this plug serves as a stop to limit the stroke of the piston nut in moving to the left. The screw 44 is threaded through the piston nut 60 and as shown in FIG. 1 may have multiple start threads which mesh with corresponding threads in the piston nut. The piston nut 60 has a cylindrical skirt 84 which extends axially in the bore 62 toward the radial end wall 86 formed in housing 14 at one end of bore 62. This end wall serves as a limit stop for the piston nut when fully stroked to the right in viewing FIG. 1. Disposed in an annular groove adjacent to the end of the skirt is an annular seal 90 which contacts the inner wall of bore 62 to provide for the separate fluid chambers 56 and 58.

Mounted within the main body of the piston nut 60 is a plunger assembly 92 which provides auxiliary or artificial reaction for the relatively rotatable valve components of the valve assembly under certain operating conditions described below. More particularly, this plunger assembly, mounted in a cylindrical bore 94 formed in the bottom land between the intermediate rack teeth 70, comprises a first plunger having a contact stem 96 that extends through a reduced diameter counter bore 98 coaxial with bore 94 into engagement with the top land or crest 100 of one of the threads of screw 44. The contact stem is connected to a disc-like head 102 which is adapted to seat in the bottom of bore 94 and which forms a seat for one end of a helical compression spring 104 mounted axially in the bore 94. The other end of spring 104 engages the head portion 106 of a second plunger which has a stem 107 extending outwardly from the head portion through a passage 108 in a nut 110 into engagement with the top land or tip of the central tooth 72 of the sector gear 74. The nut 110 is threaded into the outer portion of the bore 94 and traps the first and second plunger and the compression spring intermediate thereof within the bore. The nut 110 can be adjusted in the bore by use of a spanner type wrench can be engaged with the recesses in the nut 110. The arrangement of the two plungers and the intermediate spring is such that the tooth 72, in the centered position of the sector gear for straight ahead drive, actuates the outer plunger which in turn compresses the helical spring. The inner contact plunger is spring loaded so that its stem 96 will frictionally engage the top land of the thread 100 of the screw 44.

With the plunger assembly providing a frictional load on the screw, the valve body 32 is yieldably held so that rotation of the stub shaft for power assist steering will effect rotation of the valve spool regardless of the lash in the threaded connection between the screw 44 and the piston nut 60. With relative rotation of the valve body and spool, the valve assembly is immediately conditioned for right or left turn power assist steering according to direction of stub shaft rotation from the operator actuated handwheel. Fluid pressure from a suitable hydraulic pump not shown is accordingly directed by the rotary valve to one of the pressure chambers 56 or 58 as the other chamber is opened to exhaust. On turning of the stub shaft, the lash between the screw 44 and the piston nut threads is rapidly taken up so that the valve body is quickly grounded through the threaded mechanical connection. As the piston nut strokes, the sector gear 74 will be turned by engagement of the rack teeth so that the intermediate tooth 72 of the sector gear moves out of engagement with the intermediate teeth of the rack. As the tooth 72 moves out of its tooth space and as tooth 71 or 73 of the sector gear depending on direction of piston nut movement, moves into engagement with the corresponding rack teeth, the first and second plungers are unloaded and the spring 94 extends so that the inner plunger is lightly loaded for minimum drag on the screw. Thus friction loads are reduced to a point whereby the auxiliary resistance is substantially removed from the screw 44. This is beneficial in that the handwheel load is reduced when the auxiliary resistance is not needed for valve actuation. Also after cornering there is no substantial added drag from the inner plunger when the handwheel is released and the sector gear and piston nut are returned toward the on center steering area. In other words, this construction beneficially provides for increased friction loads to actuate the steering gear valving when such is needed and further provides for the substantial removal of that friction load when the gear is in the off center condition and the load is not needed. This allows for good returnability of the gear components toward their centered position from a right or left turn position.

From the above, it will be appreciated that the auxiliary load is effectively removed from the steering gear when the gear is actuated for left or right hand steering and provides for improved steering gear valve actuation since there is sufficient auxiliary resistance added to valve components permitting their relative rotation which functions at least until the lash between the screw and piston nut is taken up. Accordingly, the actuation of the valve will be faster as compared to prior constructions with resulting improved and more efficient power gear operation.

While a preferred embodiment of this invention has been shown and described to illustrate the invention, other embodiments will become more apparent to those skilled in the art. Accordingly, the scope of this invention is set forth in the following claims.

We claim:

1. A lash compensator between an externally helically threaded worm and an internally helically threaded nut having flank clearance therebetween comprising:
   transversely oriented plunger means carried by said nut and extending through a wall thereof at the root between adjacent threads and engageable with the crest of a thread on said worm;
   said nut having an external rack thereon, a rotatable input member operatively connected to said worm, and a sector gear engaging said rack having one tooth engageable with said plunger means when said sector gear is centered on said rack so as to impose a friction load on said worm and preclude movement of the worm relative to said nut through said flank clearance upon rotation of said input member when the sector gear is centered on said rack.

2. In an integral power steering gear and control valve for a vehicle in which a hydraulically actuated piston is mounted for sliding movement in the housing of the gear for turning an output in response to the selected exhaust and pressurization of hydraulic chambers on either side of said piston by the relative movement of a pair of rotatable valve members of said control valve and in which a rotatable worm driven through an input is threadedly coupled to the piston with flank clearance between the meshing threads of said worm and said piston wherein the improvement comprises plunger means operatively mounted in said piston and activated by said output when in a predetermined position to frictionally engage said worm so that a first of said valve members is thereby retarded from rotation relative to a second of said valve members as accommodated by said flank clearance and on rotation of said input before lash closure occurs in said threaded connection to thereby actuate said control valve and facilitate the selected supply and exhaust of fluid from said chambers for the hydraulic powered movement of said piston and said output.

3. A power steering gear comprising a housing, an input member operatively mounted for turning movement in said housing and extending outside one end thereof, an output member operatively mounted for turning movement in said housing and extending outwardly therefrom, piston means mounted for longitudinal sliding movement in said housing and cooperating therewith to provide first and second expansible and contractible fluid pressure chambers therein, a rotatable worm extending axially through said piston means and threadedly connected thereto, said piston having a rack on the external portion thereof, said output member having a gear segment meshingly engaged with said rack so that movement of said piston will produce rotation of said output means, drag means interposed between said worm and said gear sector, said drag means comprising a spring biased friction plunger operatively disposed in said piston nut and operative in response to movement of said gear sector to a first position to frictionally engage the outer thread of said worm to increase the frictional load thereon and to decrease the loading as said gear sector moves from said first portion to thereby decrease the friction on said worm so that said worm can be driven with reduced frictional drag.

4. A power steering gear comprising a housing, an input member operatively mounted for turning movement in said housing and extending outside one end thereof, an output member operatively mounted for turning movement in said housing and extending outwardly therefrom, piston means mounted for longitudinal sliding movement in said housing and cooperating therewith to provide first and second expansible and contractible fluid pressure chambers therein, said piston means having a toothed rack, a sector gear operatively connected to said output member and having teeth meshingly engaging said rack for drivingly connecting said piston means to said output member, said piston means having an opening extending therethrough, said opening having a helical thread on the wall thereof, rotatable actuator means extending axially through said opening of said piston means and having an external thread meshing with the thread of said piston means, a source of fluid pressure for said pressure chambers, valve means operatively connected to said source and to said pressure chambers for controlling the supply and exhaust of fluid with respect to said pressure chambers, said valve means comprising first and second valve elements, said first valve element operatively connected to said output member through the threaded connection of said piston means and said actuator means and further by the meshing engagement of said rack and said sector gear, said second valve element being operatively connected to said input member and movable relative to said first valve element in response to rotation of said input member so that said valve means controls the supply and exhaust of fluid to and from said chambers for the hydraulically powered movement of said piston means, plunger means movably mounted in said piston means and moved by one of the teeth of said sector gear for exerting a frictional force onto said thread of said actuator means to retard movement of first valve element and thereby permit the immediate relative movement of said valve elements in response to turning movement of said input member and the resulting powered movement of said piston means and said output means.

* * * * *